(12) United States Patent
Mahnad

(10) Patent No.: US 9,336,812 B1
(45) Date of Patent: May 10, 2016

(54) ADAPTIVE CONTROL OF TRACKING SERVO SYSTEM OF OPTICAL HEADS IN OPTICAL STORAGE DEVICES

(71) Applicant: Oracle International Corporation, Redwood City, CA (US)

(72) Inventor: Faramarz Mahnad, Brookline, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 14/593,601

(22) Filed: Jan. 9, 2015

(51) Int. Cl.
*G11B 7/09* (2006.01)
*G11B 7/003* (2006.01)
*G11B 7/0037* (2006.01)

(52) U.S. Cl.
CPC .............. *G11B 7/0941* (2013.01); *G11B 7/003* (2013.01); *G11B 7/09* (2013.01); *G11B 7/093* (2013.01); *G11B 7/094* (2013.01); *G11B 7/0037* (2013.01)

(58) Field of Classification Search
None
See application file for complete search history.

(56) References Cited

U.S. PATENT DOCUMENTS

| 5,796,687 | A * | 8/1998 | Baba ........................ 369/44.29 |
| 5,949,590 | A | 9/1999 | Hong |
| 6,349,079 | B1 * | 2/2002 | Belser et al. ............... 369/44.26 |
| 7,142,486 | B2 | 11/2006 | Masui et al. |
| 7,177,244 | B2 | 2/2007 | Hashimoto |
| 7,933,173 | B2 | 4/2011 | Senba |
| 7,969,832 | B2 | 6/2011 | Raniuk et al. |
| 8,339,907 | B2 | 12/2012 | Mahnad |
| 8,406,102 | B1 * | 3/2013 | Saitoh et al. ............... 369/47.15 |
| 8,593,921 | B1 | 11/2013 | Mahnad |
| 2005/0083600 | A1 | 4/2005 | Mahnad et al. |
| 2005/0083601 | A1 | 4/2005 | Mahnad et al. |
| 2005/0083602 | A1 | 4/2005 | Saliba et al. |
| 2005/0094308 | A1 | 5/2005 | Mahnad et al. |
| 2007/0025202 | A1 | 2/2007 | Huh et al. |
| 2007/0064566 | A1 | 3/2007 | Hsu et al. |
| 2009/0153387 | A1 | 6/2009 | Tayu |
| 2009/0190449 | A1 * | 7/2009 | Yamada et al. ............ 369/44.32 |
| 2010/0074076 | A1 | 3/2010 | Moon |
| 2010/0135129 | A1 | 6/2010 | Mahnad |
| 2010/0135136 | A1 | 6/2010 | Mahnad |
| 2010/0135139 | A1 | 6/2010 | Kearnan et al. |
| 2010/0136151 | A1 | 6/2010 | Mahnad et al. |
| 2011/0261661 | A1 | 10/2011 | Matsuda et al. |

* cited by examiner

*Primary Examiner* — Brian Butcher
(74) *Attorney, Agent, or Firm* — Brooks Kushman P.C.

(57) ABSTRACT

A system and method for controlling positioning of an optical pickup unit relative to at least one track of an optical data storage medium include an adaptive track position feedback controller that compensates for defocus of an optical beam relative to the optical data storage medium associated with movement across the medium and/or disturbances in distance between a lens of the optical pickup unit relative to the optical data storage medium. A track position feedback controller may include an adaptive term or parameter based on a focus (or defocus) error signal generated by a focus position feedback controller and associated sensors or detectors of a quadrature photodiode integrated circuit (PDIC).

12 Claims, 5 Drawing Sheets

ADAPTIVE CONTROL OF TRACKING SERVO SYSTEM OF OPTICAL HEADS IN OPTICAL STORAGE DEVICES

TECHNICAL FIELD

This disclosure relates to a closed-loop feedback control system having adaptive control to control position of an optical head in an optical data storage device.

BACKGROUND

As data storage density continues to increase in various types of optical data storage devices, such as optical tape and optical disk drives, it is increasingly more important to provide repeatable and accurate positioning of the optical head to reliably read and write data. As such, high performance tracking servo subsystems are needed to control movement of the optical head and focus the optical beam over desired target locations on the optical media to reliably write or read the data at a particular location.

As with various types of control systems, the frequency bandwidth of the controller directly impacts the system response to various types of disturbances that may be encountered during operation. In an optical data storage device, the frequency bandwidth of the positioning or tracking servo subsystem directly impacts the ability of the optical head to track the location of the targeted data in the presence of wide band media and mechanical disturbances. As such, improving the bandwidth of the positioning or tracking subsystem may reduce data read/write errors and/or allow increased data storage density.

SUMMARY

A system and method for controlling positioning of an optical pickup unit relative to at least one track of an optical data storage medium may include an adaptive track position feedback controller that compensates for defocus of an optical beam relative to the optical data storage medium associated with movement across the medium or other disturbances in distance between a lens of the optical pickup unit relative to the optical data storage medium. A track position feedback controller may include an adaptive term or parameter based on a focus (or defocus) error signal generated by a focus position feedback controller.

Various embodiments of the present disclosure include an optical media storage system having an optical pickup unit configured to read and write data on optical media, and including at least one lens movable relative to the optical media by a focus actuator to adjust focus of an optical beam relative to the optical media. A track actuator may be configured to move the optical pickup unit across a width of the optical media to read and write data within at least one track on the optical media. A first feedback controller may be operatively associated with the focus actuator to position the at least one lens of the optical pickup unit along a first axis to focus the optical beam relative to the optical media and to generate a focus error signal. A second feedback controller may be operatively associated with the track actuator to control the track actuator and position the optical pickup unit along a second axis relative to the at least one track of the optical media in response to a tracking error signal and the focus error signal. In one embodiment, the first and second feedback controllers are implemented at least in part by a microprocessor-based controller in communication with the track actuator and the focus actuator. The second feedback controller may control positioning of the optical pickup unit based on magnitude of the focus error signal. In one embodiment, the second feedback controller controls positioning of the optical pickup unit based on a function of an absolute value of the focus error signal, which may include a reciprocal of the absolute value of the focus error signal.

Embodiments may include a method for controlling an optical pickup unit of an optical data storage system that generates a focus error signal in response to an optical beam focus position along a first axis relative to an optical data storage medium, and positions the optical pickup unit by a track actuator in communication with a microcontroller along a second axis as a function of the focus error signal. The function may vary based on magnitude of the focus error signal, which may include varying inversely with absolute value of the focus error signal. In one embodiment, positioning the optical pickup unit includes moving the optical pickup unit across at least one of a plurality of tracks on the optical data storage medium. The focus error signal may be generated by a first feedback controller configured to position at least one lens of the optical pickup unit along the first axis relative to the optical data storage medium. Positioning the optical pickup unit may include a second feedback controller configured to generate a signal for the track actuator to move the optical pickup unit across a width of the optical data storage medium.

Various embodiments may include an optical tape system having an optical pickup unit operatively associated with a track actuator configured to position the optical pickup unit relative to tracks of an optical tape and a focus actuator configured to move at least one lens to focus an optical beam relative to the optical tape. A microprocessor-based controller operatively associated with the track actuator and the focus actuator controls the track actuator to position the optical pickup unit relative to the tracks of the optical tape based on a signal associated with defocus of the at least one lens relative to distance between the at least one lens and the optical tape. The microprocessor-based controller may be configured with a focusing feedback control loop to generate a signal for the focus actuator to position the at least one lens in response to a defocus feedback signal, and a tracking feedback control loop to generate a signal for the track actuator based on the defocus feedback signal from the focusing feedback control loop. The tracking feedback control loop may generate the signal for the track actuator based on magnitude/amplitude or absolute value of the defocus feedback signal. In one embodiment, the tracking feedback control loop generates the signal for the track actuator as a function of the defocus feedback signal, which may be based on a reciprocal of an absolute value of the feedback signal.

Various advantages may be associated with one or more embodiments. For example, an adaptive tracking or positioning controller that compensates for sensitivity to defocus increases controller frequency bandwidth to provide more accurate positioning of the optical pickup unit (OPU) in an optical media storage device. Improved positioning accuracy associated with increased frequency bandwidth of the tracking servo subsystem facilitates higher density data storage devices.

The above advantages and other advantages and features will be readily apparent from the following detailed description of the preferred embodiments when taken in connection with the accompanying drawings.

DETAILED DESCRIPTION

As required, at least one representative embodiment is described in detail. However, it is to be understood that the disclosed embodiments are used to demonstrate particular features of the disclosure that may be embodied in various and alternative forms not explicitly described or illustrated. The figures are not necessarily to scale; some features may be exaggerated or minimized to show details of particular components. Therefore, specific structural and functional details should not to be interpreted as limiting, but merely as a representative basis for teaching one skilled in the art to variously employ the features of the disclosure.

Servo or feedback control systems in optical data recording devices such as optical tape drives utilize tracking error signals, detected from the optical media via a device such as an optical pickup unit (OPU), to accurately store and retrieve data from the optical media. As the present inventor has recognized, characteristics of the focusing subsystem of the OPU optical heads impact system performance through the resulting effect on the tracking system. As such, the representative embodiments described herein reduce or minimize the impact of defocus of the optical head on the bandwidth of the tracking servo system using a cross compensation method to adapt the tracking servo system based on the detected optical head defocus.

In high track-per-inch optical storage systems, reliable retrieval of data depends on the performance of associated tracking servo systems. Track mis-registration in these systems can cause performance degradation and loss of data associated with errors in accurately positioning the optical head over the track containing data. Present tracking servo systems for rewritable optical media position the optical head over the perceived data track based on reference tracking signals generated by the OPU according to its diffraction properties and the physical format of the media.

Figure 1A:
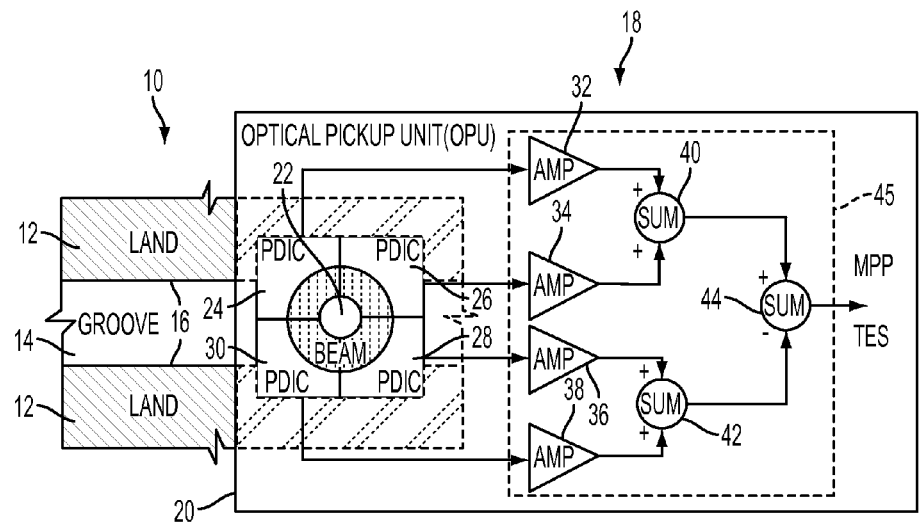
FIGS. 1A and 1B are block diagrams illustrating operation of an optical pickup unit (OPU) to generate a tracking error signal (TES) and S-curve signal for use in adaptive positioning control according to various embodiments.
Figure 1B:
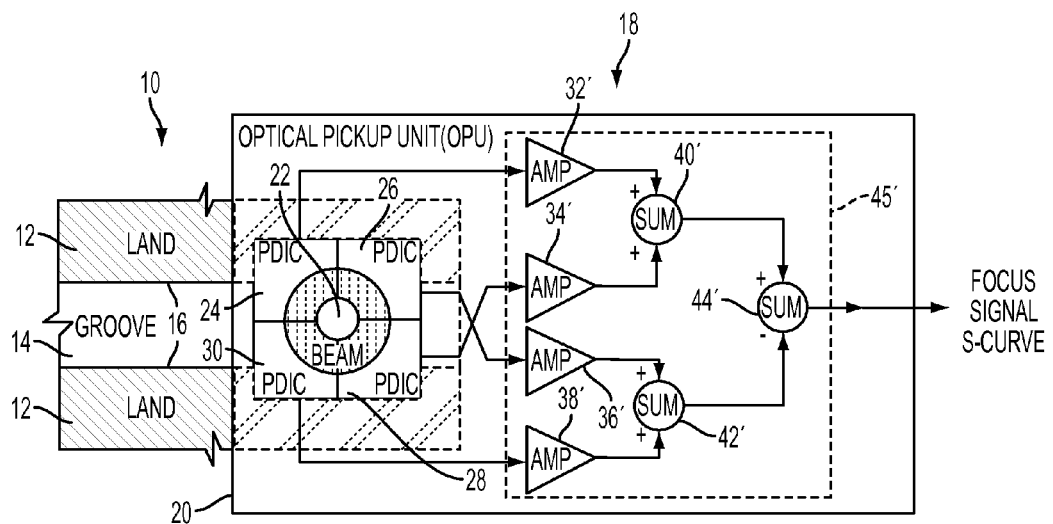

Referring to FIGS. 1A and 1B, block diagrams illustrating operation of a system or method for controlling an optical data storage device having an OPU with adaptive positioning feedback control according to various embodiments of the disclosure are shown. The representative optical recording system stores and retrieves data from an associated optical data storage medium, such as an optical tape. Optical data storage medium 10 includes a nanostructure surface relief pattern embossed on the surface of the optical medium. The nanostructure includes lands 12 and grooves 14 embossed in the Z direction (i.e., parallel to the face of optical data storage medium 10) during a preformatting process. Data may be written to or read from phase change material within the groove 14 as known in the art. Transitions between lands 12 and grooves 14 define edges 16 that can be used for tracking purposes. These surface relief patterns are used to generate the tracking signals used by a servo system to track the position of an optical head reading or writing to the medium. An optical drive OPU with the aid of electronic signal processing generates a tracking error signal (TES) (FIG. 1A) from the detected patterns. The OPU also generates a focus signal S-curve signal (FIG. 1B). The TES and S-curve signals are used in the adaptive feedback control system as illustrated and described in greater detail below.

As illustrated in FIGS. 1A and 1B, an optical system 18 may include an optical pickup unit (OPU) 20. The OPU 20 may include various hardware, electronics, and circuitry, such as laser diodes, etc., to generate and focus a laser beam 22. OPU 20 may also include a quadrature photodiode integrated circuit (quad-PDIC) may include associated detectors 24, 26, 28, 30, amplifiers 32, 34, 36, 38. OPU 20 may include sum blocks 40, 42, and difference block 44 used to generate the TES as illustrated in FIG. 1A. FIG. 1B illustrates the same OPU 20 of FIG. 1A, with detectors 24, 26, 28, and 30 also connected to amplifiers 32', 34', 36', and 38', as well as sum block 40' and 42' and difference block 44' used to generate the focus signal S-curve.

A technique referred to as Radial Push Pull Tracking signal generation (typically used within the context of disk media), also referred to as Main Push Pull (MPP) (typically used within the context of optical tape media) may be used to generate a Tracking Error Signal (TES) for the optical recording media preformatted with land and groove track geometries. This strategy generates a reference tracking signal based on the geometries of land and groove tracks on the media as detected by the quadrature PDIC and associated detectors 24, 26, 28, 30. The MPP tracking infrastructure is generally represented by reference numeral 45.

Output from PDIC detectors 24, 26, 28, 30 provides signals indicative of the position of the edges 16 relative to the OPU 20 to amplifiers 32, 34, 36, 38 respectively. Output from amplifiers 32, 34 is input to an associated summing block 40. Output from amplifiers 36, 38 is input to an associated summing block 42. Output from summing blocks 40, 42 is input to difference block 44. The resulting output from difference block 44 can be referred to as an MPP or radial push pull tracking signal. In a similar manner, output from amplifiers 32', 34' is input to an associated summing block 40' and output from amplifiers 36', 38' is input to an associated summing block 42'. Output from summing blocks 40', 42' is input to difference block 44' with the resulting output from difference block 44' used to generate the focus signal S-curve.

Figure 2A:
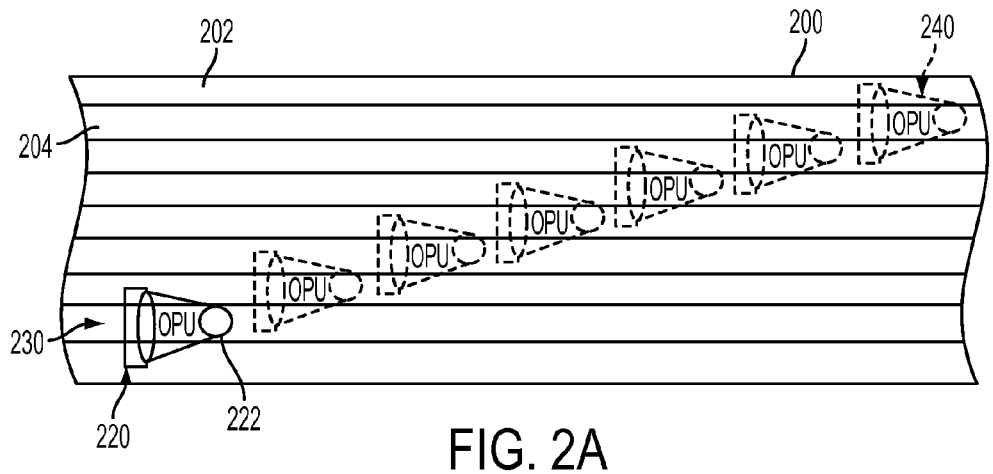
FIGS. 2A and 2B illustrate an ideal tracking error signal (TES) generated by a tracking servo subsystem such as illustrated in FIG. 1A as an optical pick-up unit (OPU) crosses multiple tracks of an optical data storage medium, such as an optical tape.
Figure 2B:
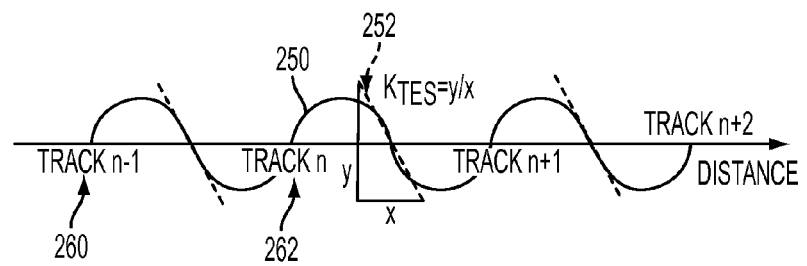
Figure 2C:
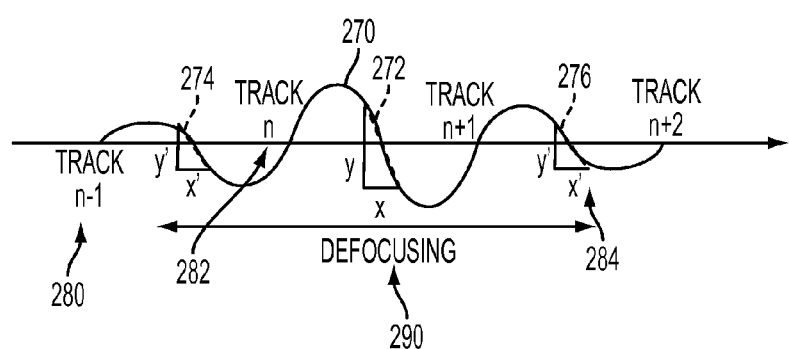
FIG. 2C illustrates the effect of optical beam defocus on a TES generated by a tracking servo subsystem as an OPU crosses multiple tracks of an optical data storage medium, such as an optical tape.

The shape of an MPP tracking signal reflects the relative movement between the edges 16 and OPU 20. An MPP tracking signal having the shape of a horizontal line, for example, would indicate that the laser beam 22 is centered between the edges 16. An MPP tracking signal having the shape of a sinusoid, for example, would indicate that the laser beam 22 is moving relative to the edges 16. FIGS. 2A and 2B illustrate an ideal TES generated by a tracking servo subsystem as an OPU crosses lands and grooves of multiple tracks of an optical data storage medium, such as an optical tape. FIG. 2C illustrates the effect of defocus associated with mechanical disturbances or media movement on the TES generated by a tracking servo subsystem as the OPU crosses lands and grooves of multiple tracks of an optical data storage medium. Output from PDIC detectors 24, 26, 28, and 30 may also be used to provide a signal used by the focusing subsystem, sometimes referred to as an S-curve signal as illustrated and described with reference to FIGS. 1B, 3A, and 3B.

As illustrated in FIG. 2A, optical tape 200 includes a plurality of lands 202 and grooves 204 associated with corresponding tracks, only some of which are shown. OPU 220 generates an optical beam 222. OPU 220 and associated optical beam 222 moves across the plurality of tracks from a starting or first position 230 to a target or second position 240. The corresponding ideal TES signal 250 is shown in FIG. 2B. Ideal TES signal 250 varies in a generally sinusoidal pattern as OPU 220 moves across the lands 202 and grooves 204 of associated tracks, such as a first track 260 (track n−1) and second track 262 (track n). The peak magnitude or peak-to-peak magnitude of ideal TES signal 250 as illustrated in FIG. 2B is substantially constant assuming ideal focusing of the objective lens that is used to focus optical beam 222 on optical tape 200. The sensitivity constant represented by slope 252 of the piecewise linear portion of the sinusoid is represented by $K_{TES}=y/x$.

FIG. 2C illustrates the effect of optical beam defocus on the TES as the OPU moves across multiple tracks of an optical data storage medium, such as an optical tape. TES 270 has a sensitivity parameter or slope that varies as a function of defocusing 290 of the optical beam. As illustrated in FIG. 2C, slope 272 is greater than the slope or sensitivity constant at 274 and at 276 where the optical beam has more defocusing. As OPU moves across track 280 (n−1) to track 282 (n) and to track 284 (n+2), the peak-to-peak amplitude and the slope or sensitivity constant vary due to defocusing of the objective lens of the OPU associated with relative motion between the objective lens and the optical media. This effectively reduces the sensitivity constant ($K_{TES}=y/x$) of TES 270 as compared to the ideal TES 250 illustrated in FIG. 2B. Because frequency bandwidth of the tracking servo subsystem is inherently proportional to the sensitivity value, the tracking servo subsystem bandwidth is also reduced by an amount based on the amount of defocus of the objective lens.

Figure 3A:
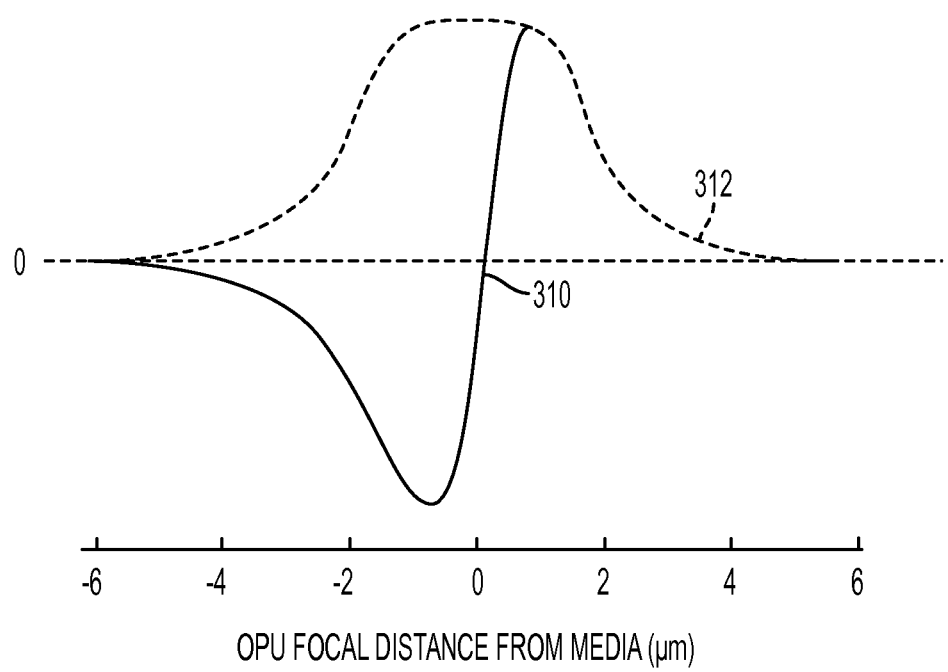
FIGS. 3A-3B illustrate the influence of defocus S-curve sensitivity on the TES generated by a tracking servo subsystem as an OPU crosses multiple tracks of an optical tape in one embodiment.
Figure 3B:
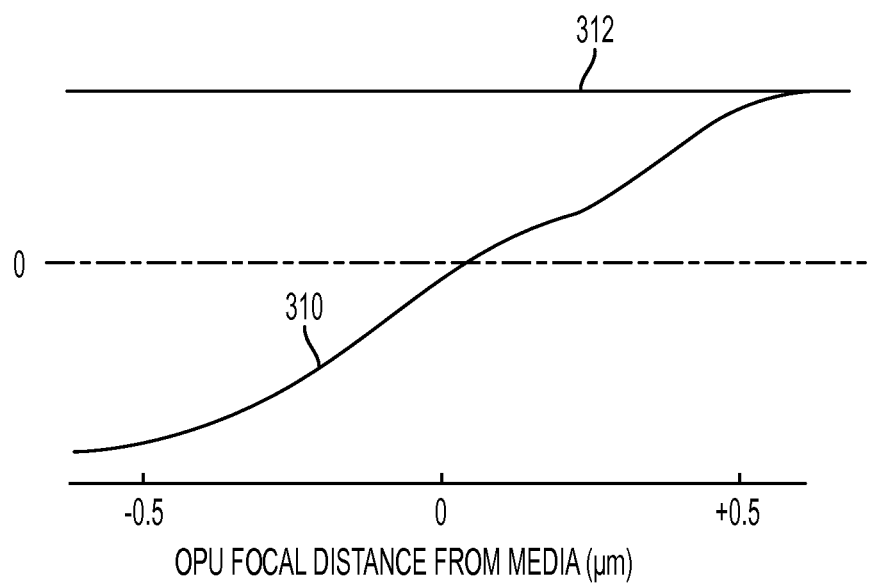

FIGS. 3A and 3B illustrate the influence of defocus S-curve sensitivity on the TES generated by a tracking servo subsystem as an OPU crosses multiple tracks of an optical tape in one embodiment. As previously described, the PDIC detectors (FIG. 1B) are used to generate an S-curve signal 310, as well as a sum signal 312 used by the focusing subsystem to control and reduce or minimize defocus of the objective lens using a feedback control loop as illustrated and described with reference to FIG. 4. The S-Curve signal 310 and sum signal 312 illustrated as a function of OPU focal distance from the optical media (in micrometers) in FIG. 3A are shown on an expanded scale in FIG. 3B.

Figure 4:
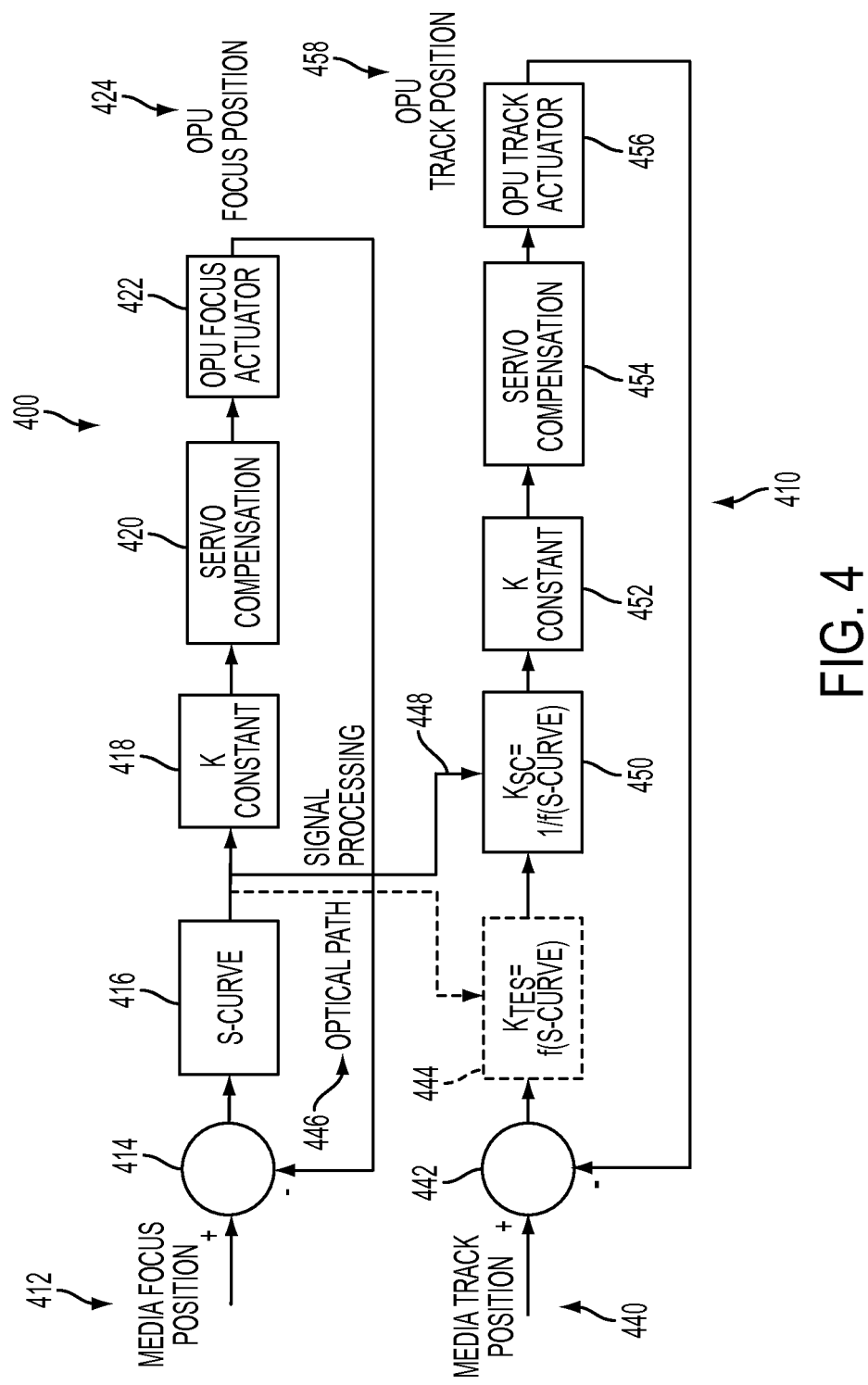
FIG. 4 includes control system block diagrams illustrating an OPU focusing feedback control or servo loop and an adaptive OPU track position feedback control or servo loop of one embodiment.

FIG. 4 includes control system block diagrams illustrating an OPU focusing feedback control or servo loop 400 and an adaptive OPU track position feedback control or servo loop 410 of one embodiment. Focusing servo loop 400 positions the OPU objective lens along a first axis to control distance between the lens and the optical media, whereas track position servo loop controls positioning of the OPU along a second axis generally laterally across a width or radius of the optical media. As previously described, high performance of the tracking servo subsystem assures accurate positioning of the optical head over the desired locations on the optical media to reliably write and read data at a particular location. The frequency bandwidth of the feedback control loop of the tracking servo subsystem directly impacts the ability of the optical head to track the location of the targeted data in the presence of wide band media and mechanical disturbances. Because focusing performance of the optical heads also impacts the performance of the tracking system, it is desirable to reduce or minimize the effect of defocus of the optical head on the bandwidth of the tracking servo subsystem.

Focusing feedback control loop 400 and tracking feedback control loop 410 may be implemented using feedback signals from various sensors, such as the detectors associated with PDIC (FIGS. 1A and 1B) in combination with processing electronics and circuitry in cooperation with signals provided by a programmable microprocessor or microcontroller, or similar dedicated logic device to provide the desired control functionality. Focusing feedback control loop 400 includes a target media focus position signal represented at 412, which is combined with a focus feedback signal at 414. The previously described S-curve signal represented by block 416 is applied to the difference signal, followed by a constant (K) at 418 and a servo compensation or control law block as represented at 420. The resulting signal is provided to the OPU focus actuator 422. The resulting OPU focus position as represented by 424 is detected by one or more sensors or detectors with an associated feedback signal provided to block 414.

Track position feedback control loop 410 receives a desired media track position as represented at 440, which is combined with a track position feedback signal at block 442. Because the value of the S-curve as represented by block 416 is proportional to the defocus of the objective lens (as illustrated in FIGS. 2 and 3), and the sensitivity constant $K_{TES}$ also changes as a function of defocus, the optical path 446 or position of the optical beam being focused by servo loop 400 will influence the positioning control loop as generally represented at 444 as a function of the S-curve signal 416 ($K_{TES}=f(\text{S-curve})$). To reduce or minimize the dependency or influence of defocus on the tracking subsystem sensitivity constant, an adaptive signal processing block is provided using an electronic signal 448 based on the S-curve value from block 416 as represented at 450. The electronic signal is based on an inverse or reciprocal of the S-curve functional dependence of the sensitivity constant, i.e. $K_{SC}=1/f(\text{S-curve})$.

The resulting signal or value from block 450 may be further adjusted by a constant (K) at 452 and the servo compensation or control law block 454 to provide an associated signal to the OPU track actuator to position the OPU laterally or across the width of the optical media as represented at 456. The position of the OPU relative to a desired track on the optical media is detected by associated sensors or detectors that provide a feedback signal to block 442. In one embodiment, empirical measurements of $K_{TES}$ were used to determine the functional dependency of $K_{TES}$ to the associated S-curve values. To a first degree/order of approximation, the functional dependency was determined to be represented by $K_{TES}=1-k*\text{ABS}(\text{S-curve})$, where k is a measurable constant. As such, an adaptive signal processing block 450 was provided with a functional relationship of $KSC=1/(1-k*\text{ABS}(\text{S-curve}))$ to reduce or minimize the frequency bandwidth dependency of the track position control loop 410 to the S-curve value (focusing error) influence of the focus position control loop 400.

As generally illustrated in FIGS. 1-4, an optical media storage system of one embodiment includes an OPU 20 configured to read and write data on an optical data storage media, such as optical tape 10. The OPU 20 includes at least one lens 220 movable relative to the optical media by a focus actuator 422 to adjust focus of an optical beam 22, 222 on the optical media 10. An OPU track actuator 456 is configured to move the OPU 20 across a width of the optical media 10 to read and write data within at least one track on the optical media 10. A first feedback controller 400 is operatively associated with the focus actuator 422 to position the at least one lens of the optical pickup unit along a first axis to focus the optical beam 222 relative to the optical media 200 and to generate a focus error signal 416. A second feedback controller 410 is operatively associated with the track actuator 456 to control the track actuator and position the optical pickup unit 20 along a second axis relative to the at least one track of the optical media 200 in response to a tracking error signal 444 and the focus error signal 416.

Figure 5:
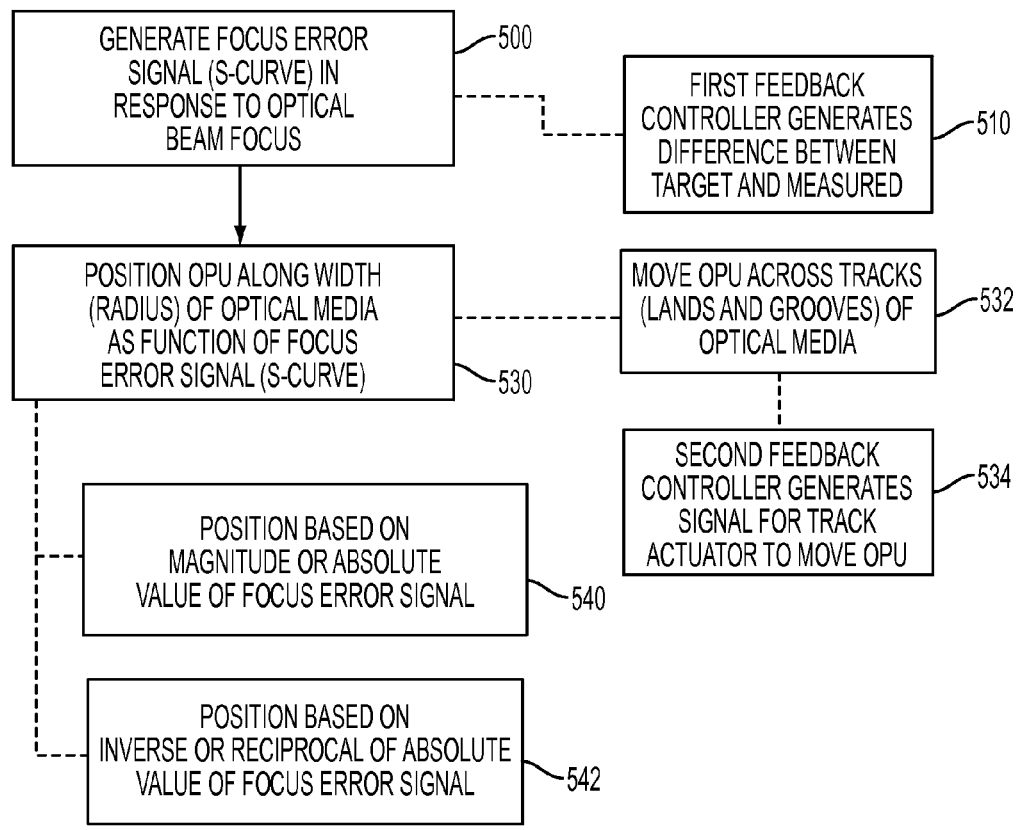
FIG. 5 is a flowchart illustrating operation of a system or method for controlling an optical media data storage device of various embodiments.

FIG. 5 is a flowchart illustrating operation of a system or method for controlling an optical media data storage device of various embodiments. The system or method may include generating a focus error signal in response to an optical beam focus position along a first axis relative to an optical data storage medium as represented by block 500. The focus error signal may be generated by a first feedback controller configured to position at least one lens of the optical pickup unit along the first axis relative to the optical data storage medium as represented by block 510. The system or method may also include positioning the optical pickup unit by a track actuator in communication with a microcontroller along a second axis as a function of the focus error signal (S-curve signal) as represented by block 530. Positioning the OPU may include moving the OPU across at least one of a plurality of tracks on the optical data storage medium as represented by block 532. Positioning the optical pickup unit may also include a second feedback controller configured to generate a signal for the track actuator to move the optical pickup unit across a width of the optical data storage medium as represented by block 534. The function may vary based on magnitude of the focus error signal as represented by block 540. Alternatively, the function may vary inversely with absolute value of the focus error signal as represented by block 542.

The processes, methods, algorithms, or logic disclosed can be deliverable to or implemented by a processing device, controller, or computer, which can include any existing programmable electronic control unit or dedicated electronic control unit or circuitry. Similarly, the processes, methods, or algorithms can be stored as data and instructions executable by a controller or computer in many forms including, but not limited to, information permanently stored on non-writable storage media such as ROM devices and information alterably stored on writeable storage media such as flash memory, magnetic tapes or disks, optical tape or disks, RAM devices, and other magnetic, optical, and combination media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components.

While exemplary embodiments have been described, it is not intended that these embodiments include all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. Any embodiments described as providing advantages or being preferred over other embodiments or prior art implementations with respect to one or more desired characteristics are not necessarily preferred in all applications. Those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure.

What is claimed is:

1. An optical media storage system comprising:
an optical pickup unit configured to read and write data on optical media, the optical pickup unit including at least one lens movable relative to the optical media by a focus actuator to adjust focus of an optical beam on the optical media;
a track actuator configured to move the optical pickup unit across a width of the optical media to read and write data within at least one track on the optical media;
a first feedback controller operatively associated with the focus actuator to position the at least one lens of the optical pickup unit along a first axis to focus the optical beam relative to the optical media and to generate a focus error signal; and
a second feedback controller operatively associated with the track actuator to control the track actuator and position the optical pickup unit along a second axis relative to the at least one track of the optical media in response to a tracking error signal and the focus error signal, the second feedback controller positioning the optical pickup unit based on a function of an absolute value of the focus error signal.

2. The system of claim 1 wherein the first and second feedback controllers are implemented at least in part by a microprocessor-based controller in communication with the focus actuator and the track actuator.

3. The system of claim 1 wherein the second feedback controller controls positioning of the optical pickup unit based on a reciprocal of the absolute value of the focus error signal.

4. The system of claim 1 wherein the optical media comprises optical tape.

5. A method for controlling an optical pickup unit of an optical data storage system, comprising:
generating a focus error signal in response to an optical beam focus position along a first axis relative to an optical data storage medium; and
positioning the optical pickup unit by a track actuator in communication with a microcontroller along a second axis as a function of the focus error signal, the function varying inversely with absolute value of the focus error signal.

6. The method of claim 5 wherein positioning the optical pickup unit comprises moving the optical pickup unit across at least one of a plurality of tracks on the optical data storage medium.

7. The method of claim 5 wherein the focus error signal is generated by a first feedback controller configured to position at least one lens of the optical pickup unit along the first axis relative to the optical data storage medium.

8. The method of claim 7 wherein positioning the optical pickup unit comprises a second feedback controller configured to generate a signal for the track actuator to move the optical pickup unit across a width of the optical data storage medium.

9. The method of claim 5 wherein the optical data storage medium comprises an optical tape.

10. An optical media system comprising:
- an optical pickup unit operatively associated with a track actuator configured to position the optical pickup unit relative to tracks of an optical data storage media and a focus actuator configured to move at least one lens to focus an optical beam on the optical data storage media; and
- a microprocessor operatively associated with the track actuator and the focus actuator, the microprocessor controlling the track actuator to position the optical pickup unit relative to the tracks of the optical data storage media based on a signal associated with defocus of the at least one lens relative to distance from the optical data storage media, the microprocessor being configured with a focusing feedback control loop to generate a signal for the focus actuator to position the at least one lens in response to a defocus feedback signal, and a tracking feedback control loop to generate a signal for the track actuator based on the defocus feedback signal from the focusing feedback control loop, the tracking feedback control loop generating the signal for the track actuator as a function of an absolute value of the defocus feedback signal.

11. The optical media system of claim 10 wherein the tracking feedback control loop generates the signal for the track actuator as a function of a reciprocal of an absolute value of the feedback signal.

12. The optical media system of claim 10 wherein the optical data storage media comprises an optical tape.

* * * * *